J. L. FINN,
Assignor to A. S. DODD, said DODD assignor to THE CHINNOCK ELECTRIC COMPANY.
Telegraph Insulator.
No. 9,484. Reissued Nov. 30, 1880.
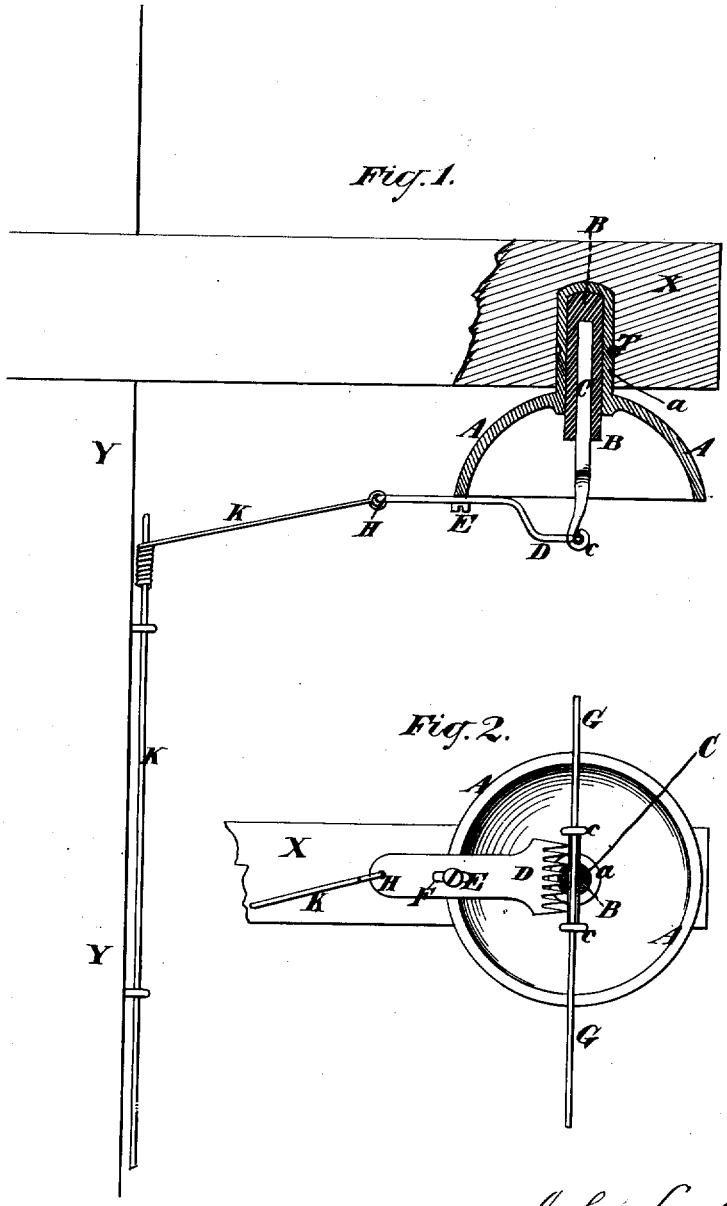
Witnesses
John. Becher
Geo. Stayner
Inventor
John L. Finn
by his Attorneys
Brown & Brown

UNITED STATES PATENT OFFICE.

JOHN L. FINN, OF ELYRIA, OHIO, ASSIGNOR TO AMZI S. DODD, OF NEW YORK, N. Y.; SAID DODD ASSIGNOR TO THE CHINNOCK ELECTRIC COMPANY, OF SAME PLACE.

TELEGRAPH-INSULATOR.

SPECIFICATION forming part of Reissued Letters Patent No. 9,484, dated November 30, 1880.

Original No. 75,889, dated March 24, 1868. Application for reissue filed August 25, 1880.

*To all whom it may concern:*

Be it known that I, JOHN L. FINN, of Elyria, in the county of Lorain and State of Ohio, have invented a new and useful Improvement in Telegraph-Insulators; and I do hereby declare that the following is a full, clear, and exact description thereof, which will enable others skilled in the art to make and use the same, reference being had to the accompanying drawings, forming part of this specification.

This invention consists of an improved telegraph-insulator and lightning-arrester; and its objects are to provide a more effectual mode of insulating telegraph-wires, and to collect and arrest free and undesirable electricity pervading the wires and convey it harmlessly into the ground. It can also be applied in other cases in which the presence of free electricity interferes with the use of the electrometer or galvanometer.

In the accompanying drawings, Figure 1 is a vertical section front view of a pole and an insulator, with certain appurtenances embodying my invention; and Fig. 2 is a bottom plan of the insulator, certain appurtenances, and a bearer of the pole.

The same letters apply to the same parts in both drawings.

The insulator consists of a dome or bell shaped shell, A, of cast-iron or other suitable material, comprising a hollow shank, *a*, inserted in the arm or bearer X, attached to the telegraph-pole Y, and in which shank is fitted an insulator, B, of glass, china, porcelain, or other non-conducting substance, glass being preferred. The shank *a* is secured in the arm X by one or more pins, T, passing through the arm and into a slot or groove in the exterior surface of the shank made to receive it, or it may be secured in any other suitable manner. The arm X is attached to the telegraph-pole Y in any suitable manner, so that the mouth of the bell hangs down to preserve the apparatus from the weather and from watery connection with the earth. A finger, C, bearing the telegraph-wire in its prongs *c c*, hooked for that purpose, is held by its shank in the glass insulator B, and may be secured with cement, if desired. A toothed conductor, D, made of sheet-copper or other good conducting substance, is secured in place by a screw, E, passing through a slot, F, in the shank or shaft H of the toothed conductor into the rim or base of the shell A, and may be adjusted by means of the screw E and slot F to within one-twentieth of an inch from the telegraph line-wire or conductor, and I prefer that it shall approach the wire between the prongs of the finger, *c c*. A ground or conducting wire, K, attached to and electrically connected with the shank H of the toothed conductor D, is led to the telegraph-pole Y, and thence into the ground. The bearer X forms a support for the finger C, whereby the line-wire or conductor is sustained, and the shank *a* of the insulator constitutes an electric conductor applied between the said support and the finger connected with the ground.

By this arrangement the free electricity which, during storms or an electric condition of the atmosphere, or from any other cause, may pervade the wires, often seriously impeding the working of and sometimes destroying the telegraph, will be collected and arrested by the toothed conductor and carried harmlessly away.

The results obtained by the electrometer and galvanometer are often rendered unreliable through the presence of free electricity, and my invention can be readily adapted to remove this cause of error.

I do not confine myself to the use of any particular form of arrester, but prefer the form here shown.

Having thus described my invention, what I claim as new, and desire to secure by Letters Patent, is—

1. The combination of a line-wire or conductor, a finger sustaining the same, an arm or bearer of non-conducting material supporting said finger, and an electrical conductor applied between the finger and the said arm or bearer and connected with the ground, substantially as and for the purpose specified.

2. The combination of a line-wire or conductor, a finger sustaining the same, an insulator surrounding and supporting said finger, a shell of electric conducting material surrounding said insulator, a pole of non-conducting material, and a ground-wire in electric communication with the said shell of electric conducting material and extending along said pole to the ground, substantially as specified.

3. The combination and arrangement of the bell-shaped shell A, finger C, the adjustable toothed conductor D, and conducting-wire K, substantially as described, for the purpose specified.

4. Securing the shank *a* to the bearer X by means of the tangential pins T, passing through a groove in the side of the said shank, substantially as described, for the purpose specified.

JOHN L. FINN.

Witnesses:
FRANK E. BISHOP,
WILLARD G. LOVELL.